(No Model.)
A. ROSENTHAL.
HAT, CAP, &c.
No. 482,950. Patented Sept. 20, 1892.
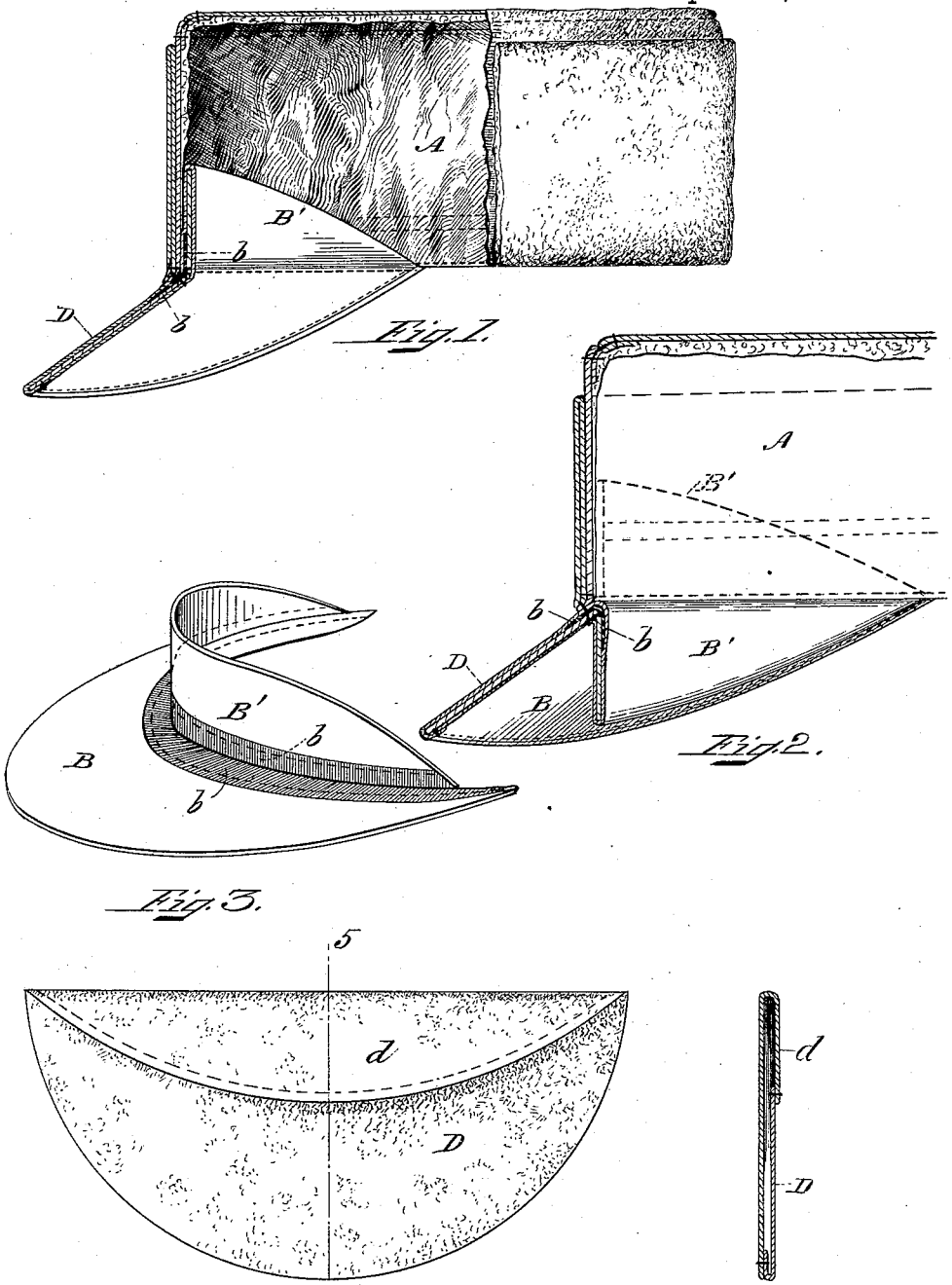
Witnesses:
H. C. Renick Jr.
John R. Snow
Inventor:
Adolph Rosenthal
by his attorneys
Maynadier & Beach

UNITED STATES PATENT OFFICE.

ADOLPH ROSENTHAL, OF BOSTON, MASSACHUSETTS, ASSIGNOR OF THREE-FOURTHS TO CHARLES ROSENTHAL, HARRY GOLDSTEIN, AND LEOPOLD BASH, OF SAME PLACE.

HAT, CAP, &c.

SPECIFICATION forming part of Letters Patent No. 482,950, dated September 20, 1892.

Application filed December 18, 1891. Serial No. 417,225. (No model.)

*To all whom it may concern:*

Be it known that I, ADOLPH ROSENTHAL, of Boston, in the county of Suffolk and State of Massachusetts, have invented a new and useful Improvement in Head-Gear, of which the following is a specification, reference being had to the accompanying drawings, in which—

Figure 1 is a section of a cap embodying my invention with the protector up. Fig. 2 is a similar view, but with the protector down. Fig. 3 is a view of the foundation, showing the protector hinged to the visor. Fig. 4 is a plan of the covering for the protector and visor. Fig. 5 is a cross-section thereof.

My invention relates to hats, caps, and other articles of head-gear having either visors or brims. By "visors" I mean a brim that extends only part way around the mouth of the body of the article, and by "brim" I mean a projection extending all around the mouth of that body.

My invention consists in features of construction described and claimed hereinafter.

As my invention is ordinarily embodied in those articles of head-gear called "caps," I have shown it so embodied in the drawings, in which—

A is the body, B the visor, and B' the protector. Ordinarily visor B and protector B' are covered with fabric D. The visor is fashioned, as usual, with a curved inner edge to fit body A; but the protector B' is hinged to the visor conveniently by strips *b*, secured to margins of the visor and protector. That edge of protector B' which is opposed to the inner edge of visor B is best curved the reverse of the curve of the inner edge of visor B, so that it also fits the mouth of body A. The fact that the visor and protector are hinged together allows the protector to be turned up into the body smoothly and neatly, so as not to discommode the wearer, and also allows the protector to be neatly turned down, as in Fig. 2, upon the forehead or other parts of the head, if so desired.

If the visor and protector are covered, it is practically desirable to provide a special covering D of bag-like form, Figs. 4 and 5, with a flap *d*. Into this bag-like covering D, I slip the hinged visor and protector and then draw the flap *d* into place, as shown in Figs. 1 and 2, and secure the flap in place. The covering D, containing the hinged visor and protector is properly secured to body A.

It is obvious that either or both features of my invention may be, if desired, embodied in various styles of articles of head-gear—for example, in a hat—the visor B in this case being a brim.

What I claim is—

1. As a new article of manufacture, a head-gear consisting of a body provided with the visor or brim B and protector B', the visor being curved on its inner edge to fit the body and hinged to the protector by a strip *b*, which is secured to the margins of the visor B and protector B', all substantially as and for the purpose set forth.

2. As a new article of manufacture, a head-gear consisting of a body provided with the visor or brim B and protector B', hinged together and incased in a bag-like covering D, having a flap *d*, the visor being fashioned on its inner edge to fit the body, the covering inclosing both the visor and protector, all substantially as and for the purpose set forth.

ADOLPH ROSENTHAL.

Witnesses:
EDWARD S. BEACH,
JOHN R. SNOW.